Aug. 4, 1953 P. H. FIDELMAN 2,647,362
STRAIGHT SPRING CONTROLLED ESCAPEMENT REGULATING SYSTEM
Filed Nov. 2, 1949

INVENTOR.
Paul H. Fidelman
BY
ATTORNEY

Patented Aug. 4, 1953

2,647,362

UNITED STATES PATENT OFFICE 2,647,362

STRAIGHT SPRING CONTROLLED ESCAPEMENT REGULATING SYSTEM

Paul H. Fidelman, New York, N. Y.

Application November 2, 1949, Serial No. 124,967

2 Claims. (Cl. 58—117)

The present invention relates to an escapement system for a spring actuated motor or mechanism such as used in horological instruments and devices, and is an extension of my invention described and claimed in my copending application Serial No. 97,211, filed June 4, 1949, for "Escapement Regulating Means."

In my said copending application I have described improved means for regulating the rate of escapement of a spring actuated motor of mechanism of the character described which operates by regulating the time or speed of the pallet oscillation, rather than the magnitude of the pallet stroke, without the use of the conventional balance wheel and hair spring.

The escapement regulating means of my said copending application included a regulating wheel in operative engagement with the pallet of the escapement system and resilient means for engaging the regulating wheel to limit its rotary movement in each direction and to impart a recoil impulse to it, at the end of each stroke or movement in one direction, to start it in motion in the opposite direction.

The present invention is directed to the provision of a further improved escapement regulating system through the improvement of the regulating wheel recoil arrangement and means for the escapement regulating system of my said application.

It is an object of the present invention to provide a recoil arrangement for the regulating wheel of an escapement regulating system of the character described which is of simplified construction and incorporates a minimum number of parts.

It is another object of the present invention to provide a recoil mechanism for the regulating wheel of an escapement system of the character described which is of improved operating efficiency.

It is also an object of the present invention to provide a recoil mechanism and arrangement for a regulating wheel of an escapement regulating system of the character described which is compact and occupies a minimum amount of space and is, therefore, of greater adaptability for use even in such small compact mechanisms as watch movements, or the like.

It is a further object of the present invention to provide a recoil mechanism for the regulating wheel of an escapement regulating system of the character described having a resilient, recoil producing element which is of minimum size and, therefore, of minimum responsiveness to changes in temperature and moisture in the air.

It is a still further object of the present invention to provide a recoil mechanism and arrangement for the regulating wheel of an escapement regulating system of the character described permitting a minimum oscillating stroke for the regulating wheel and making possible, therefore, the use of lighter materials.

It is yet a further object of the present invention to provide a recoil mechanism and arrangement for the regulating wheel of an escapement system of the character described which makes possible all of the advantages described in my said copending application for the regulating system therein described.

Still further advantages and superiorities of the recoil mechanism and arrangement of the present invention will become more readily apparent to those skilled in the art from the more or less diagrammatic embodiment of the invention shown in the accompanying drawings and from the description following. It is to be understood, however, that such embodiment is shown by way of illustration only, to make the principles and practice of the invention more readily comprehensible, and without any intent of limiting the invention to the specific details therein shown.

Figure 1:
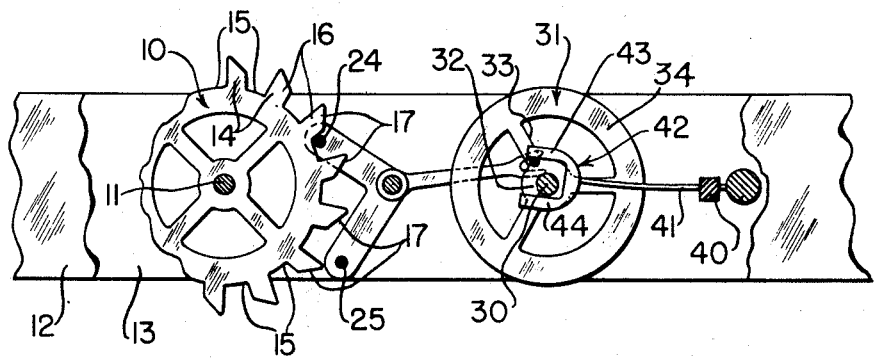
Fig. 1 is a more or less diagrammatic top plan view, partly broken away, of an escapement regulating system to which the present invention relates, showing the recoil means and arrangement of the present invention; with the parts arranged as at the end of one stroke.

Referring more specifically to the accompanying drawings, there is shown in such drawings the essential and material parts of the escapement system to which the present invention relates, in more or less diagrammatic representation, including the regulating means, which system comprises a scape wheel 10 fixed on a staff 11, which is rotatably supported between a top bridge member 12 and a bottom bridge member 13, or their equivalents, in the conventional manner. The connection of the scape wheel 10 to the driving or main spring of the mechanism, which is readily understood by and well known to those skilled in the art is, for that reason, not shown.

The scape wheel 10 may be of any conventional type, formed with radial, peripheral teeth 14, separated by spaces 15. These teeth 14 may be of any type or form conventionally used on scape wheels, such as the type illustrated, which have rectangular lower portions 16 and upper portions formed with a sloping forward face 17 adapted to permit the ready sliding movement of a pallet pin thereon or thereover as the scape wheel rotates in the direction of such pin.

Also mounted between bridges 12 and 13 is a pallet, generally designated as 20, fixed on a staff 21, which is rotatably supported between the said bridges 12 and 13. The pallet 20 is formed with the diverging arms 22 and 23 disposed at suitable angle relative one another for proper operative association with the scape wheel 10 and its teeth 14; the arms 22 and 23 carrying, respectively, the pallet pins 24 and 25.

The pallet 20 is also formed with a rear arm 26, which has an approximately V-shaped forked end 27.

Rotatably supported between the bridges 12 and 13 on a staff 30 to one side of the pallet 20, in proximity to the forked end 27 thereof, is a regulating disc or wheel 31, which may have the hub 32, a web or spokes 33, and a peripheral continuous portion 34. The wheel 31 is disposed in a plane either above the plane of the pallet 20, as illustrated, or below it, and has set thereinto, as in one of the spokes 33, a pin 35, in position to engage within the forked end 27 of the pallet 20, to operatively interengage the pallet with the regulating wheel 31.

Suitably supported from one of the bridges, as from the bridge 12, from a post or stud 40, in a plane substantially parallel to the plane of the regulating wheel 31, and preferably partially overlapping it, is a leaf spring 41. Such leaf spring 41 is preferably positioned to the side of the staff 30 opposite the pallet 20 and in approximate alinement with the pallet arm 26, and is secured in place at its end furthest from the staff 30, so that its free end approaches or partly overlaps the regulating wheel 31.

The spring 41 carries on its free end a U-shaped member 42, which in the illustrative embodiment straddles the staff 30 between its sides 43 and 44, respectively and also the extension of the pin 35. The width of the member 42, or the distance between its sides 43 and 44 is less than the magnitude of the operating stroke of the pin 35 as limited by the movement of the arm 26 of the pallet, so that as it moves in one direction and approaches the stroke end in that direction, the pin 35 will strike a side of the member 42, as side 43, in Fig. 1, tensing the spring 41, which will recoil and start the pin 35 and wheel 31 on its stroke in the opposed direction to have the pin 35 contact the side 44 of member 42, as in Fig. 2.

While the illustrative embodiment shows the spring 41 positioned in opposed relation to the pallet 20 and to the opposite side of the wheel 31 relative the pallet 20, with pin 35 projecting from both sides of the wheel 31, it may here be stated that both spring 41 and pallet 20 may lie to the same side of the staff 30 and on the same side of the wheel 31, the pin 35, in the last instance, extending a little longer from the wheel 31, and that a separate pin may be provided for recoil purposes, if desired.

It may also be here stated that suitable means may be provided for regulating the tension of spring 41, as by shortening its effective length, in any of the ways described in my copending aforesaid application or in any of my copending applications named therein.

Figure 2:
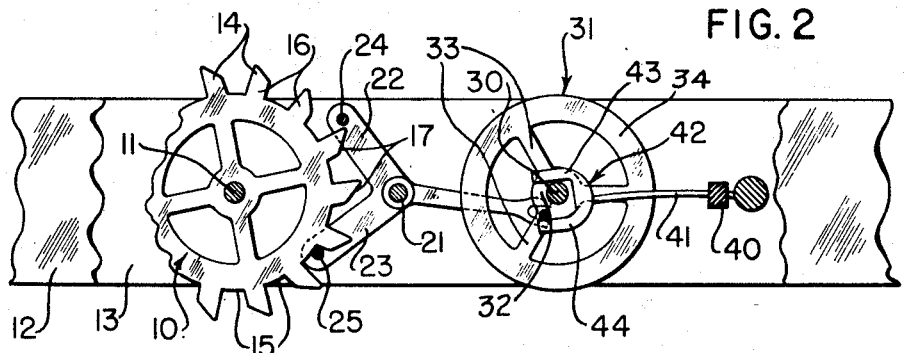
Fig. 2 is a view similar to that of Fig. 1 showing the position of the several parts at the end of the opposed stroke.
Figure 3:
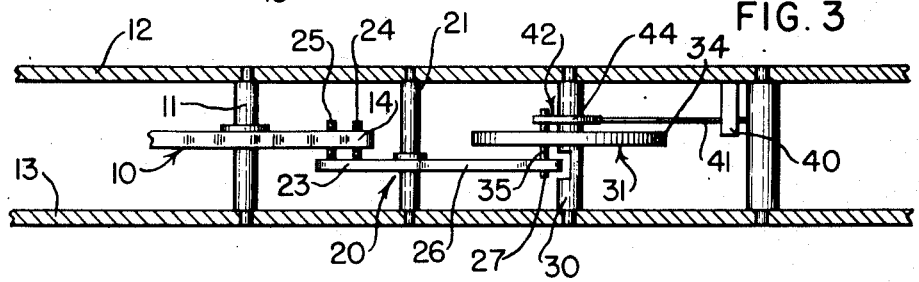
Fig. 3 is a longitudinal sectional view through the mechanism of Figs. 1 and 2.
Figure 4:
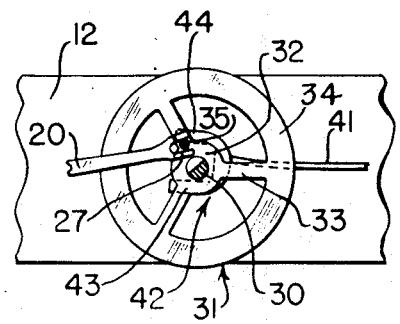
Fig. 4 is a fragmentary bottom plan view showing the regulating wheel and the parts in operative engagement with it, in the position of Fig. 2.

It will be noted from Figs. 1 and 2 of the drawings that the recoil mechanism for the escapement system of the present invention is self-banking, the staff 31 limiting the movement of the U-shaped member 42 to an extent which prevents its escape from said U-shaped member and from the forked end 27 of the pallet 20.

This completes the description of the recoil mechanism for the escapement regulating system of the present invention. It will be apparent that such mechanism is simple in construction, including but a single resilient member of simple shape, and utilizes but a single pin, both for pallet engagement and recoil; that it is compact and space saving, particularly due to the overlapping of the spring and U-shaped member with the regulating wheel past its supporting staff; that it is self banking and requires no additional banking pins; that permits of a short oscillating stroke for the regulating wheel and the use of lighter materials; and that it is highly effective to provide a positive and regular escapement rate for the system with which it is used.

It is also apparent that numerous variations and modifications, other than the ones already pointed out above, may be made by any one skilled in the art, in accordance with the principles of the invention hereinabove set forth and without the use of any inventive ingenuity. I desire, therefore, to be protected for any and all such variations and modifications that may be made within the spirit of the present invention and the scope of the claims hereto appended.

What I claim is:

1. In an escapement system for a wound spring actuated motor; a scape wheel actuated by said wound spring, a pallet operatively associated with said scape wheel, said pallet having an arm extending away from said scape wheel, said arm having a forked end, a regulating wheel rotatably supported on a staff in overlapping relation with said pallet arm for rotation in a plane parallel to the plane of the pallet arm, a driving pin on said regulating wheel engaging within said forked pallet arm end, a straight spring supported by one end in approximately diametrically opposed relation to said pallet arm with respect to said regulating wheel and overlapping said wheel with its free end, a recoil pin on said regulating wheel, and a U-shaped member on the free end of said spring arranged to have its side encompass said staff and said recoil pin.

2. The escapement system of claim 1, wherein said pallet arm and said spring are disposed along opposed faces of said regulating wheel and said recoil pin is an extension of said driving pin.

PAUL H. FIDELMAN.

References Cited in the file of this patent

UNITED STATES PATENTS

| Number | Name | Date |
|---|---|---|
| 617,852 | Colburn | Jan. 17, 1899 |
| 867,015 | Coullery | Sept. 24, 1907 |
| 2,124,019 | Wilmeth | July 19, 1938 |

FOREIGN PATENTS

| Number | Country | Date |
|---|---|---|
| 19,698 | Switzerland | May 19, 1900 |